(12) United States Patent
Kunieda et al.

(10) Patent No.: US 7,406,140 B2
(45) Date of Patent: Jul. 29, 2008

(54) WRAPAROUND CANCELLER, RELAY SYSTEM, AND WRAPAROUND CANCELLING METHOD

(75) Inventors: Yoshinori Kunieda, Tokyo (JP); Hidekuni Yomo, Kanagawa (JP); Yoshihito Kawai, Kanagawa (JP); Kenichiro Hayashi, Kyoto (JP); Kazuaki Suzuki, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 567 days.

(21) Appl. No.: 10/526,476

(22) PCT Filed: Oct. 6, 2003

(86) PCT No.: PCT/JP03/12751

§ 371 (c)(1),
(2), (4) Date: Apr. 28, 2005

(87) PCT Pub. No.: WO2004/034607

PCT Pub. Date: Apr. 22, 2004

(65) Prior Publication Data

US 2005/0191961 A1    Sep. 1, 2005

(30) Foreign Application Priority Data

Oct. 11, 2002  (JP) .............................. 2002-299523
Oct. 1, 2003   (JP) .............................. 2003-343412

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)
*H04L 1/00* (2006.01)
*H04L 25/08* (2006.01)

(52) U.S. Cl. ...................... 375/346; 375/260; 375/349; 375/232

(58) Field of Classification Search .......... 375/260, 375/346, 349, 350, 231, 232; 455/63.1, 114.2, 455/296
See application file for complete search history.

(56) References Cited

U.S. PATENT DOCUMENTS 6,563,881 B1 *  5/2003  Sakoda et al. ............... 375/260

(Continued)

FOREIGN PATENT DOCUMENTS

| JP | 11-163771 | 6/1999 |
| JP | 11-355160 | 12/1999 |
| JP | 2001-223663 | 8/2001 |

OTHER PUBLICATIONS

An article by K. Hasumi et al. at pp. 49 to 56 of The Institute of Electronics, Information and Communication Engineers Gijutsu Kenkyu Hokoku, vol. 98, No. 661 (Mar. 16, 1999).

(Continued)

*Primary Examiner*—Phuong Phu
(74) *Attorney, Agent, or Firm*—Greenblum & Bernstein, P.L.C.

(57) ABSTRACT

A loop interference canceller that carries out an adaptive operation of responding to time variations of the phase or level of loop interference wave or key station wave at high speed and with high accuracy and reduces the size of an apparatus. The loop interference canceller of the present invention limits the number of data pieces of the transmission path characteristic estimation section, realizes expansion to the entire band not through interpolation but through 0 insertion in a frequency domain and windowing after time domain transformation to reduce the number of data pieces processed and speed up the adaptive operation of the loop interference canceller, and can thereby realize high trackability for time variations of the phase and level of loop interference wave or key station wave, increase the accuracy of processing inside, perform high accuracy cancellation operation, reduce the circuit scale and achieve an advantageous effect of realizing miniaturization of the apparatus.

11 Claims, 10 Drawing Sheets

U.S. PATENT DOCUMENTS

| | | | |
|---|---|---|---|
| 7,085,314 B2 * | 8/2006 | Zhu et al. ................... | 375/214 |
| 2002/0048333 A1 * | 4/2002 | Ahmed et al. ............... | 375/346 |
| 2002/0146078 A1 * | 10/2002 | Gorokhov et al. ........... | 375/260 |
| 2004/0062317 A1 * | 4/2004 | Uesugi et al. ............... | 375/260 |

OTHER PUBLICATIONS

Hamazumi et al., "A Study of Loop Interference Canceller for the Relay Stations in an SFN for Digital Terrestrial Broadcasting," IEEE, vol. 1, pp. 167-171, published year 2000.

* cited by examiner

WRAPAROUND CANCELLER, RELAY SYSTEM, AND WRAPAROUND CANCELLING METHOD

TECHNICAL FIELD

The present invention relates to a loop interference canceller which cancels loop interference using a transmission path characteristic estimated from an OFDM (Orthogonal Frequency Division Multiplexing) signal, and more particularly, to a loop interference canceller, relay system and loop interference canceling method which speeds up an adaptive operation of the loop interference canceller by reducing the number of processed data pieces, realizes high trackability with respect to time variations of the phase and level of a loop interference wave and key station wave, carries out internal processing at a higher degree of accuracy, and can thereby carry out high accuracy cancellation operation and realize miniaturization of the apparatus with a reduced circuit scale.

BACKGROUND ART

In carrying out broadcast wave relay SFN (Single Frequency Network), for example, in terrestrial digital broadcasting, use of an OFDM transmission scheme is under study in recent years. The OFDM transmission scheme is a scheme whereby many carriers orthogonal to one another are modulated by digital data transmitted, those modulated signals are multiplexed and transmitted. The OFDM transmission scheme is characterized in that increasing the number of carriers used to several hundreds or several thousands extends the symbol time extremely and further adding a replica of a signal of the last part of an effective symbol period before the effective symbol period as a guard period signal makes the signal less susceptible to delay signals.

These features raise the possibility of a broadcasting network through a single frequency, that is, SFN, and therefore as described above, the OFDM transmission scheme is attracting attention as a transmission scheme for terrestrial digital broadcasting.

As a method of realizing an SFN, it is technologically easier to adopt a method of transmitting a signal to various relay broadcasting points using channels different from channels for broadcasting waves such as optical fibers and microwave and transmitting the signal at the same frequency. However, the method using optical fibers has a problem of channel cost and the method using microwave requires new frequency resources to be secured.

Therefore, there is a demand for the realization of an SFN through relays of broadcast wave without requiring additional frequency resources.

Realizing a broadcast wave relay SFN involves the possibility of causing deterioration of the quality of the relay signal and problems of oscillation, etc., of an amplifier because of a phenomenon of radio waves emitted from a transmission antenna wrapping around a reception antenna.

To prevent loop interference of the broadcast wave relay SFN, the following measures may be possibly taken:

(1) Reduce loop interference by arranging a transmission antenna separate from a reception antenna and using shielding by mountains and buildings, etc.

(2) Reduce loop interference by improving directional characteristics of transmission/reception antennas (3) Cancel loop interference by signal processing technology However, since there are various situations of mountains and buildings and sufficient suppression of loop interference cannot be expected from measures like improvement of directional characteristics of antennas alone, it is effective to use a loop interference canceller using the signal processing technology in (3) in addition to the measures in (1) and (2).

Conventionally, there is a proposal on a technique as such a signal processing technology (e.g., see Unexamined Japanese Patent Publication No. 11-355160) which estimates a frequency characteristic of a loop interference transmission path from a received OFDM signal, carries out an IFFT (Inverse Fast Fourier Transform) on the frequency characteristic data of the estimated loop interference transmission path to transform it into impulse response data on the time axis, sets the impulse response data as filter factors in a transversal filter to thereby create a replica signal of the loop interference and cancel the loop interference by subtracting this replica signal from the received signal. Furthermore, as its high-speed calculation processing technology, there is a transmission path characteristic estimation section provided with a decimating processing circuit (e.g., see Unexamined Japanese Patent Publication No. 2001-223663). An example of the signal processing technology in a loop interference canceller will be explained using a drawing.

FIG. 1 is a schematic view of an example of an arrangement of pilot signals and shows an arrangement of pilot signals used in DVB-T (Digital Video Broadcasting- Terrestrial) scheme which is a European terrestrial digital broadcasting scheme and ISDB-T (Integrated Services Digital Broadcasting-Terrestrial) scheme which is a Japanese terrestrial digital broadcasting scheme.

White circles in FIG. 1 represent data carriers and black circles represent pilot carriers (SP: Scattered Pilot) which are scatteringly arranged.

Furthermore, in FIG. 1, k on the horizontal axis (frequency axis) denotes a carrier number and n on the vertical axis (time axis) denotes a symbol number. At this time, an SP signal is transmitted using a carrier having a carrier number k=kp that satisfies the following (Expression 1). (Where, "mod" in the expression denotes a calculation of a remainder and "p" denotes a non-negative integer.)

$$kp=3(n \bmod 4)+12p \quad \text{(Expression 1)}$$

From this (Expression 1), it is clear that the carrier number of the SP is determined by the remainder of 4 of the symbol number n.

Furthermore, the SP signal is modulated based on a pseudo-random code string, the amplitude and phase thereof are determined by only the carrier number k arranged and do not depend on the symbol number n. How to determine the amplitude and phase is not important to this explanation and will be omitted, but it is determined by the remainder of 4 of the symbol number n as in the case of the carrier number of the SP.

Furthermore, at the right end of carriers, pilot signals are placed independently of symbol numbers. This pilot signal is also modulated based on a pseudo-random code string and the amplitude and phase thereof are determined by the remainder of 4 of the symbol number n. When the remainder of 4 of the symbol number n is 0, this pilot signal also follows (Expression 1), and therefore hereafter, pilot signals will also be included in the definition pilot carriers or SP.

FIG. 2 is a block diagram showing a configuration example of a loop interference canceller 3.

Inside a filter factor generation section 33, a transmission path characteristic estimation section 331 estimates a transmission path characteristic F(ω) from an output s(t) of a subtractor 31 and the output is supplied to an input of a residual characteristic calculation circuit 3309.

Inside the transmission path characteristic estimation section 331, an FFT (First Fourier Transform) circuit 3301 extracts a signal whose length corresponds to an effective symbol period from the output s(t) of the subtractor 31, applies an FFT to thereby transform s(t) which is a signal in a time domain into a signal in a frequency domain and the output s(ω) is supplied to an input of a symbol number extraction circuit 3302 and a first input of an SP extraction circuit 3303.

The symbol number extraction circuit 3302 extracts a symbol number for specifying the carrier number of SP from information on symbols such as TMCC (Transmission Multiplexing Configuration Control) included in the input s(ω). After symbol numbers are extracted once, adding the symbol numbers may also substitute for extraction processing. The remainder of 4 of the symbol number which is minimum information necessary to specify the carrier number, amplitude and phase of SP is output and the output is supplied to the respective second inputs of the SP extraction circuit 3303, a transmission path characteristic calculation circuit 3304 and an SP combination circuit 3305. Hereinafter, the symbol number will no longer be used directly, and therefore the remainder of 4 of the symbol number will be renamed a "symbol number."

According to the specification of the symbol number extraction circuit 3302, the SP extraction circuit 3303 extracts a signal Sp(ω) of only the SP signal from the output s(ω) of the FFT circuit 3301 and the output Sp(ω) is supplied to a first input of a transmission path characteristic calculation circuit.

According to the specification of the symbol number extraction circuit 3302, the transmission path characteristic calculation circuit 3304 generates a specified SP signal Xp(ω) whose amplitude and phase are known inside, divides the SP signal Sp(ω) which is the output of the SP extraction circuit 3303 by the Xp(ω) to calculate a transmission path characteristic Fp(ω) with respect to SP and the output is supplied to a first input of the SP combination circuit 3305.

The SP combination circuit 3305 stores transmission path characteristic Fp(ω) corresponding to four symbols for the SP, combines the SP distributed to the four symbols into the original arrangement of carriers according to the instruction of the symbol number extraction circuit 3302 and newly outputs a transmission path characteristic Fp'(ω) corresponding to the combined SP. That is, it rearranges carriers in the order of left end of Fp(ω) with symbol number 0, left end of Fp(ω) with symbol number 1, left end of Fp(ω) with symbol number 2, left end of Fp(ω) with symbol number 3, second from the left end of Fp(ω) with symbol number 0, . . . . The transmission path characteristic Fp'(ω) with respect to the combined SP which is the output is supplied to interpolation circuit 3306.

The interpolation circuit 3306 interpolates the transmission path characteristic Fp'(ω) scatteringly obtained with respect to the combined SP and estimates a transmission path characteristic for the entire signal band.

That is, the interpolation circuit 3306 interpolates the transmission path characteristic at the positions of data carriers deleted from between SPs and obtains a transmission path characteristic for the entire signal band using the transmission path characteristic for the already calculated SP. There may be various possible methods for interpolation such as a method of applying a low pass filter in the carrier direction. This method realizes interpolation by carrying out a convolutional calculation according to an impulse response of the low pass filter. However, from the standpoint of accuracy and stability, the impulse response cannot be helped but be set to a finite length. The interpolation circuit 3306 outputs the transmission path characteristic for the entire signal band obtained and the output is supplied to a decimating circuit 3308.

The decimating circuit 3308 decimates data and reduces the number of data pieces to shorten the processing time in the subsequent circuits. The decimating processing is carried out in such a way as to prevent the phase relationship from being shifted by the transform into the time axis at the IFFT circuit 3310 and prevent the position of carrier data which becomes a central frequency of IFFT processing from being shifted. Under the constraint of IFFT processing, data is decimated for every power of 2 in the number of data pieces. The number of data pieces decreases as the decimating interval increases, but as described in the Unexamined Japanese Patent Publication No. 2001-223663, there is a practical limit and it is limited to approximately 2 or 4. Furthermore, when data is not decimated, the decimating circuit can be omitted. The data F(χ) after the decimating is output from the transmission path characteristic estimation section 331 and the output is supplied to the residual characteristic calculation circuit 3309.

FIG. 3 schematically expresses the internal operation of the transmission path characteristic estimation section 331. The operation has already been explained, and therefore the figure will be used only for reference and explanations thereof will be omitted.

The residual characteristic calculation circuit 3309 calculates a cancellation residual E(ω) from the output F(ω) of the transmission path characteristic estimation section 331 and the output is supplied to the IFFT circuit 3310.

The IFFT circuit 3310 carries out an IFFT on the output E(ω) of the residual characteristic calculation circuit 3309 to thereby transform a residual E(ω) in the frequency domain into a residual e(t) in the time domain and the output is supplied to a factor updating circuit 3311.

The factor updating circuit 3311 calculates a filter factor w_new(t) from the output e(t) of the IFFT circuit 3310 based on a predetermined factor updating expression and the output is supplied as the output w_fir(t) of the filter factor generation section 33 to a second input of a FIR filter 32.

Then, the condition under which the loop interference canceller 3 cancels loop interference will be explained.

First, the output F(ω) of the transmission path characteristic estimation section 331 is expressed by (Expression 2).

$$F(\omega) = \frac{w\_in(\omega)}{1 - \{w\_in(\omega)w\_out(\omega)w\_loop(\omega) - w\_fir(\omega)\}} \quad \text{(Expression 2)}$$

Therefore, the condition under which the loop interference signal is canceled by the subtractor 31 is expressed by (Expression 3).

$$w\_in(\omega)w\_out(\omega)w\_loop(\omega) = w\_fir(\omega) \quad \text{(Expression 3)}$$

Here, when the cancellation residual E(ω) is defined as shown in (Expression 4), $$E(\omega) = w\_in(\omega)w\_out(\omega)w\_loop(\omega) - w\_fir(\omega) \quad \text{(Expression 4)}$$

to modify (Expression 2), then (Expression 5) is obtained.

$$E(\omega) = 1 - \frac{w\_in(\omega)}{F(\omega)} \quad \text{(Expression 5)}$$

Here, suppose the frequency characteristic of the reception section is flat within the signal band using a simplified model. The transfer function w_in(ω) becomes constant D and is calculated within the residual characteristic calculation circuit 3309 based on (Expression 6).

$$D = \sum_{\omega} F(\omega) \quad \text{(Expression 6)}$$

At this time, the cancellation residual E(ω) is expressed by (Expression 7).

$$E(\omega) = 1 - \frac{D}{F(\omega)} \quad \text{(Expression 7)}$$

Furthermore, the factor updating expression at the factor updating circuit 3311 is defined by (Expression 8)

$$w\_new(t) = w\_old(t) + \mu e(t) \quad \text{(Expression 8)}$$

where, w_old(t) in (Expression 8) is a factor before updating and μ is a non-negative constant of 1 or below.

In the above described configuration, feedback control operates so that the cancellation residual E(ω) which is a difference between the loop interference transfer function w_loop(ω)w_out(ω) and transfer function w_fir(ω) of the FIR filter 32 converges to 0 and only the key station wave component is output to the output s(t) of the loop interference canceller 3.

FIG. 4 is a block diagram in which annotations are made on the number of data pieces processed at various sections of the loop interference canceller 3. Connections in the respective sections and their processing are completely the same as those in FIG. 2, and therefore explanations of their operations will be omitted. The number of data pieces applies to the case of the transfer in mode 3 of the aforementioned ISDB-T scheme.

At the input/output of the FFT circuit 3301, the input of the symbol number extraction circuit 3302 and the first input of the SP extraction circuit 3303, the number of data pieces is 8192. At the output of the SP extraction circuit 3303, the first input and output of the transmission path characteristic calculation circuit 3304 and the first input of the SP combination circuit 3305, the number of data pieces is 469 which is the number of SPs included in one symbol. At the output of the SP combination circuit 3305 and the input of the interpolation circuit 3306, the number of data pieces is 1873 which is the number of SPs corresponding to four symbols (however, the pilot at the right end is common). At the output of the interpolation circuit 3306 and the input of the decimating circuit 3308, the number of data pieces represents a carrier allocation, and therefore it is 8192 in the same way as the input/output of the FFT circuit 3301. At the output of the decimating circuit 3308, the input/output of the residual characteristic calculation circuit 3309 and the input/output of the IFFT circuit 3310, the number of data pieces changes according to how data is reduced by the decimating processing, but it is the same number of data pieces and realistically 2048 or 4096 or 8192.

This loop interference canceller is required to provide high trackability with respect to time variations of the phase and level of a loop interference wave or key station wave, high accuracy cancellation operation and miniaturization of the apparatus.

However, in the above described configuration, the transmission path characteristic of the entire signal band is estimated through interpolation on the transmission path characteristic by SPs first and then the residual characteristic is calculated, and therefore the number of data pieces increases, which prevents high-speed processing, and moreover the incompleteness of the impulse response of a low pass filter used for interpolation (e.g., finite length) reduces the estimation accuracy of the transmission path characteristic and there is also a problem that the low pass filter requires a large circuit scale.

DISCLOSURE OF INVENTION

It is an object of the present invention to speed up an adaptive operation of a loop interference canceller by reducing the number of data pieces processed to thereby realize high trackability with respect to time variations of the phase and level of loop interference wave or key station wave, carry out a high accuracy cancellation operation by increasing the accuracy of internal processing and reducing the circuit scale to thereby realize the miniaturization of the apparatus.

A subject of the present invention is to calculate a residual characteristic on the transmission path characteristic by a combined SP (Scattered Pilot) and then applying IFFT processing to the residual characteristic to which 0s are inserted to transform it into a time domain signal and then carrying out windowing instead of calculating the residual characteristic on the transmission path characteristic by the combined SP after interpolation processing and transforming the residual characteristic to the time domain signal through IFFT processing.

This speeds up the adaptive operation of the loop interference canceller through a reduction of the number of data pieces processed, realizes high trackability with respect to time variations of the phase and level of loop interference wave or key station wave, improves the accuracy of the processing inside, carries out a high accuracy cancellation operation and reduces the circuit scale, and can thereby obtain the advantageous effect of realizing miniaturization of the apparatus.

The loop interference canceller according to an embodiment of the present invention is a loop interference canceller for canceling loop interference between transmission/reception antennas when multicarrier signals having reference carriers at regular intervals are relayed at the same frequency for transmission and reception, comprising a cancellation section that cancels loop interference included in a received signal using a filter for which a factor is set, a transmission path characteristic estimation section that estimates the transmission path characteristic of a signal after the loop interference is canceled, a residual characteristic calculation section that calculates a cancellation residual based on the estimation result of the transmission path estimation section, a 0 insertion section that inserts 0 data for the output of the residual characteristic calculation section, an inverse fast Fourier transform section that transforms the output of the 0 insertion section into a time domain signal, a windowing section that extracts either a range of the repetitive component of the transmission path characteristic with respect to the output of the inverse fast Fourier transform section or a range specified by the factor of the filter, whichever is smaller, and an updating section that updates the factor of the filter based on the output of the windowing section.

The loop interference canceling method according to another embodiment of the present invention is a loop interference canceling method for canceling loop interference between transmission/reception antennas when multicarrier signals having reference carriers at regular intervals are relayed at the same frequency for transmission and reception, comprising a canceling step of canceling loop interference included in a received signal using a filter for which a factor is set, a transmission path characteristic estimating step of estimating the transmission path characteristic of a signal after the loop interference is canceled, a residual characteristic calculating step of calculating a cancellation residual based on the estimation result of the transmission path estimation section, a 0 inserting step of inserting 0 data for the output result of the residual characteristic calculation step, an inverse fast Fourier transforming step of transforming the output result of the 0 insertion step into a time domain signal, a windowing step of extracting either a range of the repetitive component of the transmission path characteristic with respect to the output of the inverse fast Fourier transform step or a range specified by the factor of the filter, whichever is smaller, and an updating step of updating the factor of the filter based on the output result of the windowing step.

BEST MODE FOR CARRYING OUT THE INVENTION

With reference now to the attached drawings, embodiments of the present invention will be explained in detail below.

Figure 5:
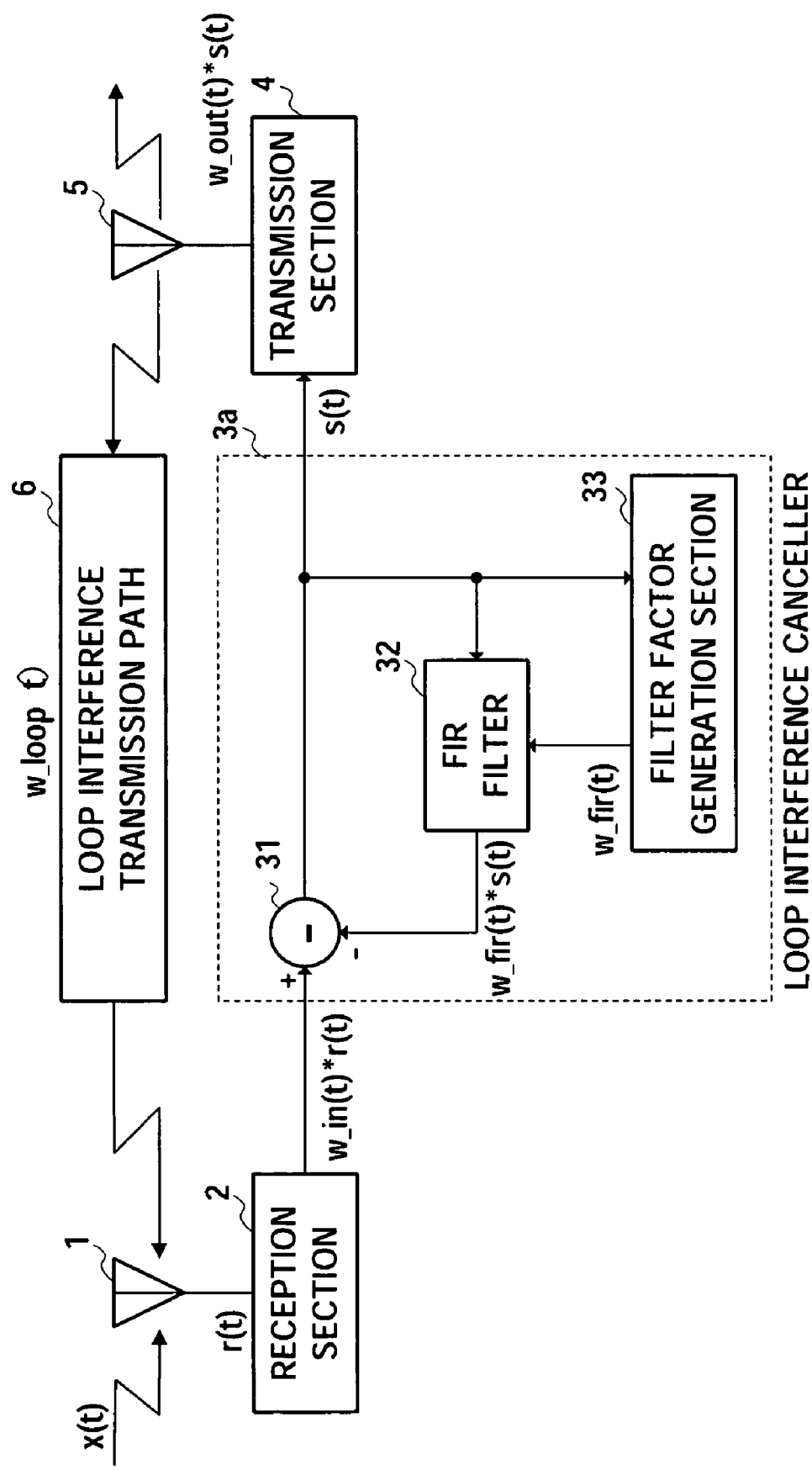
FIG. 5 is a block diagram showing an example of a theoretical configuration of a relay broadcast system using the loop interference canceller according to an embodiment of the present invention.

FIG. 5 is a block diagram showing a model of an SFN relay system using a loop interference canceller. Symbol "*" in the figure denotes a convolutional calculation. Furthermore, signals or responses will be handled as complex numbers hereafter unless otherwise specified. Suppose "(t)" denotes a signal in the time domain and "(ω)" denotes a signal in the frequency domain, and when a signal is defined in one domain, it is also defined in the other domain simultaneously.

The reception section 2 in FIG. 5 converts a signal in an RF (Radio Frequency) band to a baseband signal, while the transmission section 4 contrarily converts a baseband signal to an RF band signal. However, these frequency conversions do not have any substantial influence on the present invention, and therefore these frequency conversions will not be mentioned hereafter unless otherwise specified.

In FIG. 5, x(t) denotes a key station signal, r(t) denotes an input signal of the reception section 2, s(t) denotes an input signal of the transmission section 4, w_in(t) denotes an impulse response of the reception section 2, w_out(t) denotes an impulse response of the transmission section 4, w_loop(t) denotes an impulse response of the loop interference transmission path 6 and w_fir(t) denotes an impulse response of an FIR (Finite Impulse Response) filter 32 inside a loop interference canceller 3a.

In FIG. 5, a reception antenna 1 receives a signal combining the key station signal x(t) and loop interference signal w_loop(t)*w_out(t)*s(t) from the loop interference transmission path and the output r(t) is supplied to the reception section 2. The reception section 2 carries out processing such as filtering, frequency conversion and gain adjustment, etc., on the received signal r(t) and the output w_in(t)*r(t) is supplied to a first input of a subtractor 31 in the loop interference canceller 3a.

In the loop interference canceller 3a, the subtractor 31 subtracts the output w_fir(t)*s(t) of the FIR filter 32 from the output w_in(t)*r(t) of the reception section 2 and the output s(t) is supplied to the first input of the FIR filter 32 and filter factor generation section 33 and at the same time, supplied to the transmission section 4 as the output of the loop interference canceller 3a.

The filter factor generation section 33 estimates the characteristic of the transmission path from the output s(t) of the subtractor 31 to generate a filter factor and the output w_fir(t) is supplied to a second input of the FIR filter 32.

The FIR filter 32 carries out a convolutional calculation by the output w_fir(t) of the filter factor generation section 33 on the output s(t) of the subtractor 31 to generate a replica w_fir(t)*s(t) of the loop interference signal and the output is supplied to a second input of the subtractor 31.

The transmission section 4 carries out processing such as filtering, frequency conversion and gain adjustment on the output s(t) of the subtractor 31 to generate a relay signal w_out(t)*s(t) and the output is supplied to a transmission antenna 5.

The transmission antenna 5 emits the output w_out(t)*s(t) of the transmission section 4 and part of the output is passed through the loop interference transmission path 6 and then wrapped around the reception antenna 1 as the loop interference signal w_loop(t)*w_out(t)*s(t).

Here, the condition under which the loop interference canceller 3a cancels out loop interference will be explained.

First, output Fp'(ω) of the transmission path characteristic estimation section 331a is expressed by (Expression 9). Note that for the OFDM as a whole, not only SP but the outputs of all data carriers are expressed by F(ω) as shown in (Expression 2), and as in the case of this embodiment, the output at only the frequency of the pilot carriers (SP) is expressed by Fp(ω). Then, this output Fp(ω) expresses the output of one symbol and when a plurality of symbols is combined, it is expressed by Fp'(ω).

$$Fp'(\omega) = \frac{w\_in(\omega)}{1 - \{w\_in(\omega)w\_out(\omega)w\_loop(\omega) - w\_fir(\omega)\}} \quad \text{(Expression 9)}$$

Therefore, the condition under which the loop interference signal is canceled out by the subtractor 31 is expressed by (Expression 10).

$$w\_in(\omega)w\_out(\omega)w\_loop(\omega) = w\_fir(\omega) \quad \text{(Expression 10)}$$

Here, if the cancellation residual E(ω) is defined as shown in (Expression 11), $$E(\omega) = w\_in(\omega)w\_out(\omega)w\_loop(\omega) - w\_fir(\omega) \quad \text{(Expression 11)}$$

to modify (Expression 9), (Expression 12) is obtained.

$$E(\omega) = 1 - \frac{w\_in(\omega)}{Fp'(\omega)} \quad \text{(Expression 12)}$$

Here, suppose the frequency characteristic of the reception section 2 is flat within the signal band using a simplified model. The transfer function w_in(ω) becomes a constant D and it is calculated within the residual characteristic calculation circuit 3309 based on (Expression 13).

$$D = \sum_{\omega} Fp'(\omega) \quad \text{(Expression 13)}$$

At this time, the cancellation residual E(ω) is expressed by (Expression 14).

$$E(\omega) = 1 - \frac{D}{Fp'(\omega)} \quad \text{(Expression 14)}$$

Furthermore, the factor updating circuit 3311 defines the factor updating expression as (Expression 15).

$$w\_new(t) = w\_old(t) + \mu e(t) \quad \text{(Expression 15)}$$

where, w_old(t) in (Expression 15) is a factor before updating, μ is a non-negative constant of 1 or below. Under the above described condition, feedback control is performed so that the cancellation residual E(ω) between the loop interference transfer function w_loop(ω)w_out(ω) and transfer function w_fir(ω) of the FIR filter 32 converges to 0, and only the key station wave component is output to the output s(t) of the loop interference canceller 3.

Figure 6:
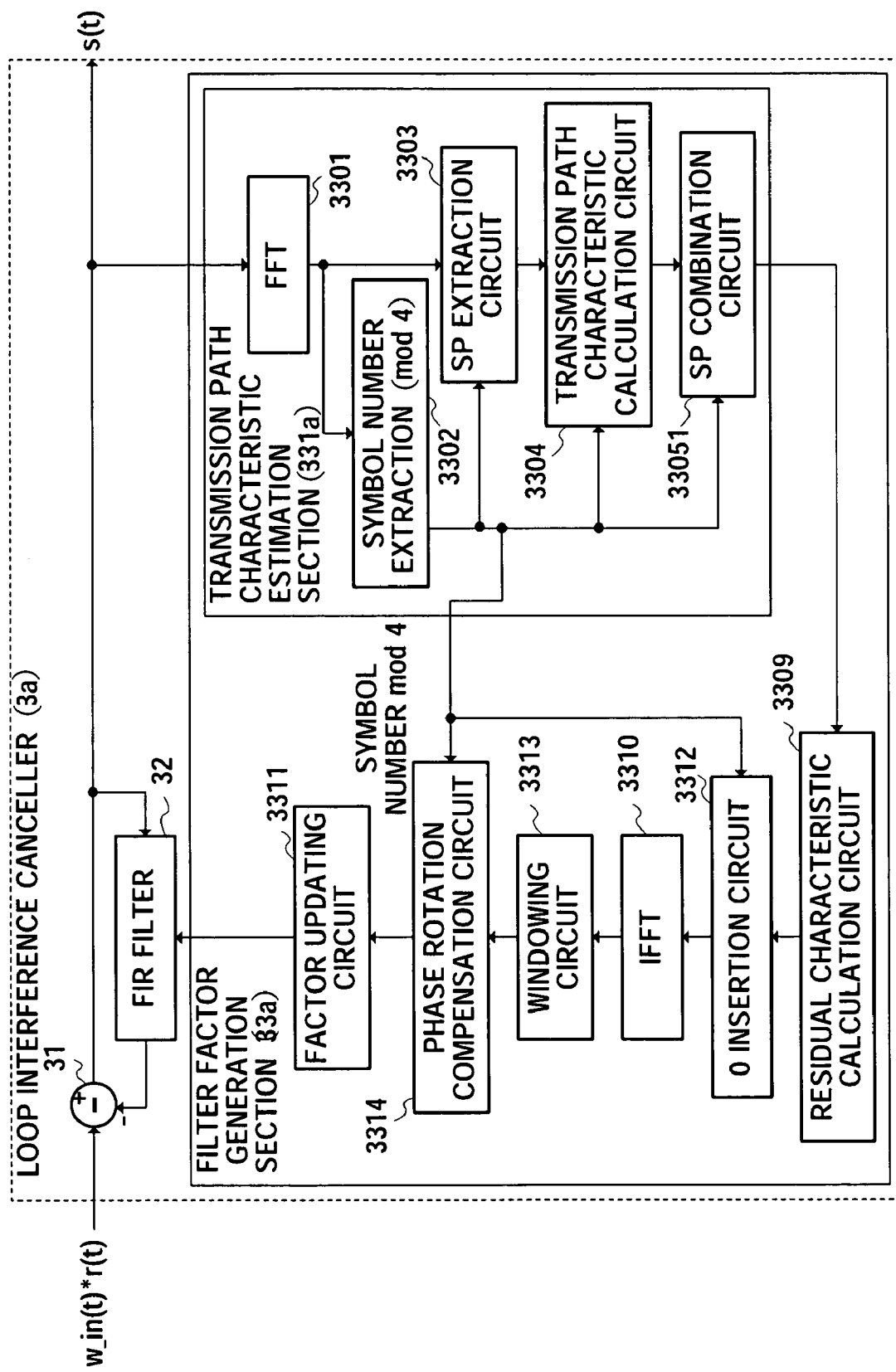
FIG. 6 illustrates a block diagram showing a configuration of the loop interference canceller according to the embodiment of the present invention.

FIG. 6 is a block diagram showing a configuration of the loop interference canceller 3a according to embodiment of the present invention. In FIG. 6, the same components as those in FIG. 2 will be explained with the same reference numerals assigned.

Inside the filter factor generation section 33a, a transmission path characteristic estimation section 331a regards the transmission path characteristic F(ω) estimated from the output s(t) of the subtractor 31 as a first output and the output is supplied to the input of a residual characteristic calculation circuit 3309. The transmission path characteristic estimation section 331a regards the symbol number which is the minimum information necessary to specify the carrier number, amplitude and phase of SP as the second output, and the output is supplied to the respective second inputs of a 0 insertion circuit 3312 and a phase rotation compensation circuit 3314.

Inside the transmission path characteristic estimation section 331a, an FFT (First Fourier Transform) circuit 3301 extracts a signal corresponding to the effective symbol period from the output s(t) of the subtractor 31, carries out an FFT to transform the s(t) which is a time domain signal into a frequency domain signal and the output s(ω) is supplied to the input of a symbol number extraction circuit 3302 and the first input of an SP extraction circuit 3303.

The symbol number extraction circuit 3302 extracts symbol numbers for specifying the arrangement of SPs from the information on symbols such as TMCC (Transmission Multiplexing Configuration Control) included in the inputs (ω). Once symbol numbers are extracted, adding up the symbol numbers can also substitute for the extraction processing. The remainder of 4 of the symbol number which is the minimum information necessary to specify the carrier number, amplitude and phase of SP is output and the output is supplied to the respective second inputs of the SP extraction circuit 3303, transmission path characteristic calculation circuit 3304, SP combination circuit 33051, 0 insertion circuit 3312 and phase rotation compensation circuit 3314. Hereafter, symbol numbers will not be directly used, and therefore the remainder of 4 of the symbol number will be renamed a "symbol number."

According to the specification from the symbol number extraction circuit 3302, the SP extraction circuit 3303 extracts the signal Sp(ω) of the only SP signal from the output S(ω) of the FFT circuit 3301 and the output Sp(ω) is supplied to the first input of the transmission path characteristic calculation circuit 3304.

According to the specification of the symbol number extraction circuit 3302, the transmission path characteristic calculation circuit 3304 generates a specified SP signal Xp(ω) whose amplitude and phase are known inside and divides the SP signal Sp(ω) which is the output of the SP extraction circuit 3303 by the SP signal Xp(ω) to thereby obtain the transmission path characteristic Fp(ω) with respect to SP and the output is supplied to the first input of the SP combination circuit 33051.

The SP combination circuit 33051 stores the transmission path characteristic Fp(ω) for SPs for a plurality of symbols, combines SPs distributed to a plurality of symbols at the positions of the original carriers according to the specification of the symbol number extraction circuit 3302 according to a rule R specified beforehand and newly outputs the transmission path characteristic Fp'(ω) for the combined SP. The rule R will be explained in more detail later.

Figure 1:
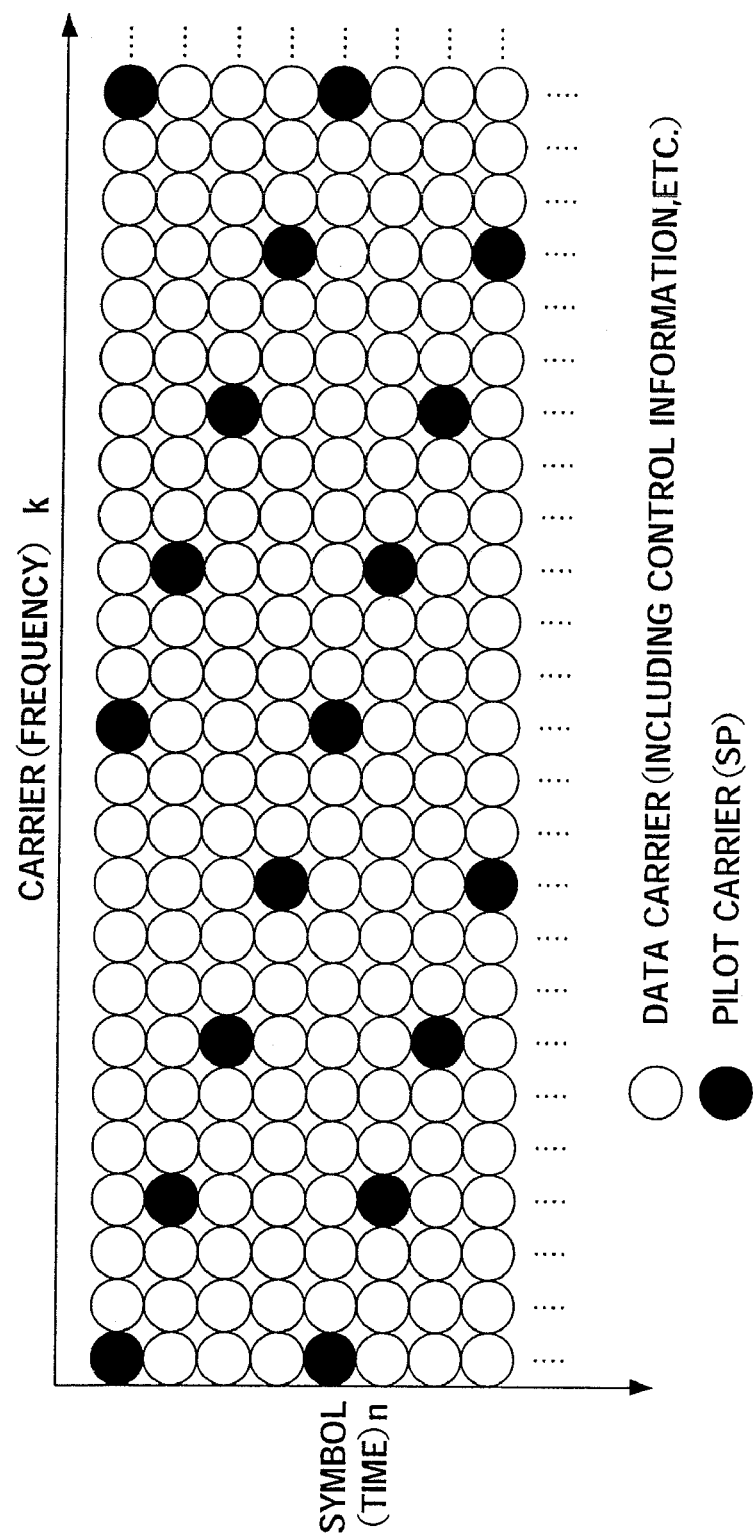
FIG. 1 is a schematic view showing an example of arrangement of pilot signals.
Figure 2:
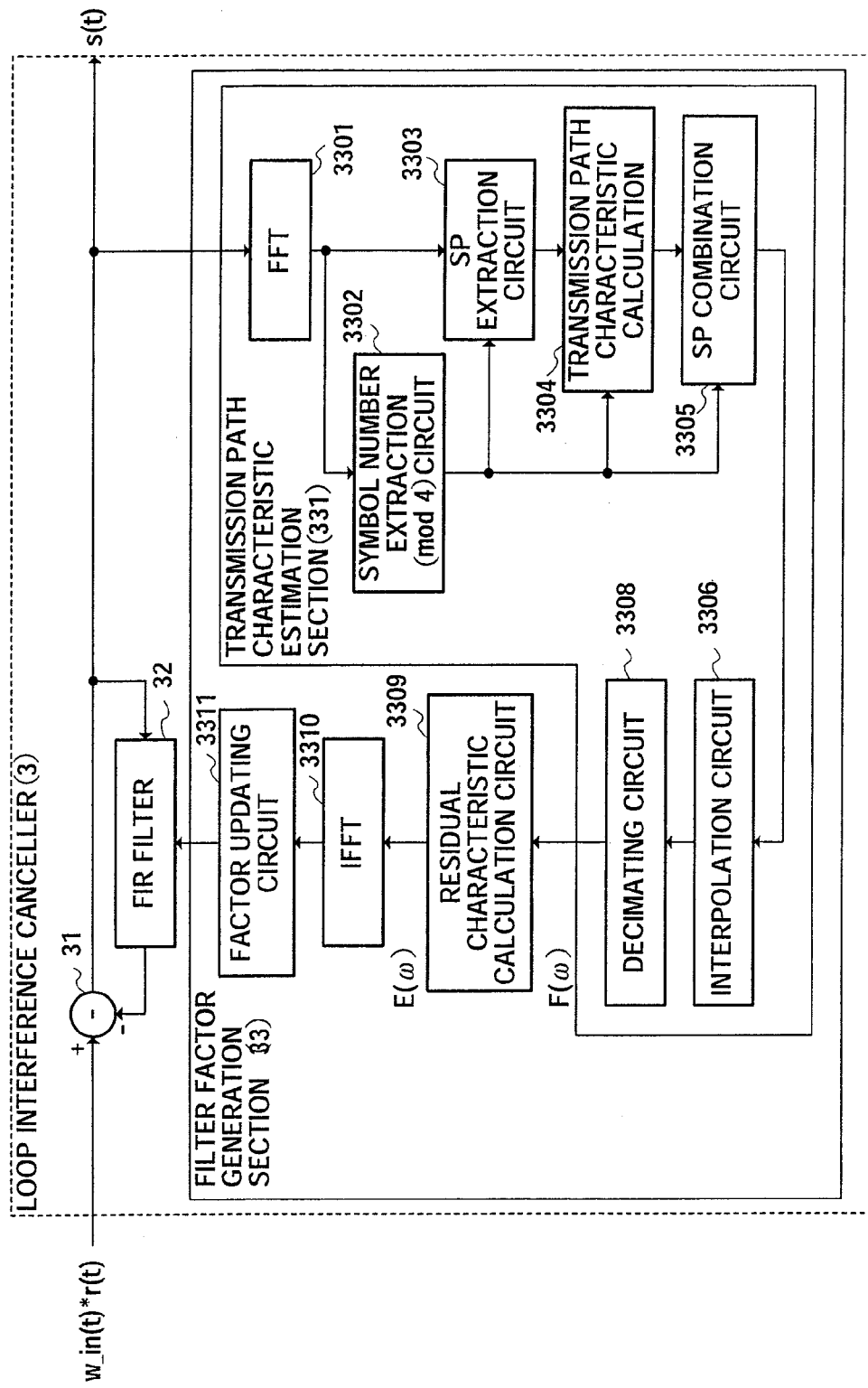
FIG. 2 is a block diagram showing a configuration example of a loop interference canceller.

When consecutive four symbols are combined according to the rule R, the same processing as that for the SP combination circuit 3305 explained in FIG. 2 is used.

Furthermore, when only one symbol is used according to the rule R, it goes without saying that no combination is required and the SP combination circuit 33051 can be omitted.

The output Fp'(ω) of this SP combination circuit 33051 is used as the first output of the transmission path characteristic estimation section 331a and the output is supplied to the residual characteristic calculation circuit 3309.

The residual characteristic calculation circuit 3309 calculates the cancellation residual E(ω) from the output Fp'(ω) of the transmission path characteristic estimation section 331a, uses the calculated cancellation residual $E(\omega)$ as the output and the output is supplied to the first input of the 0 insertion circuit 3312.

The 0 insertion circuit 3312, IFFT circuit 3310, windowing circuit 3313 and phase rotation compensation circuit 3314 convert the cancellation residual $E(\omega)$ supplied to the first input of the 0 insertion circuit 3312 to a time domain signal $e(t)$ while interpolating characteristics among SPs.

First, the 0 insertion circuit 3312 inserts 0s at the positions of the data carriers deleted from between cancellation residuals $E(\omega)$ of the combined SP which is the first input. The way how to insert 0s depends on the rule R. In short, two 0s are inserted at a time. The rule R will be explained in more detail later.

Figure 3:
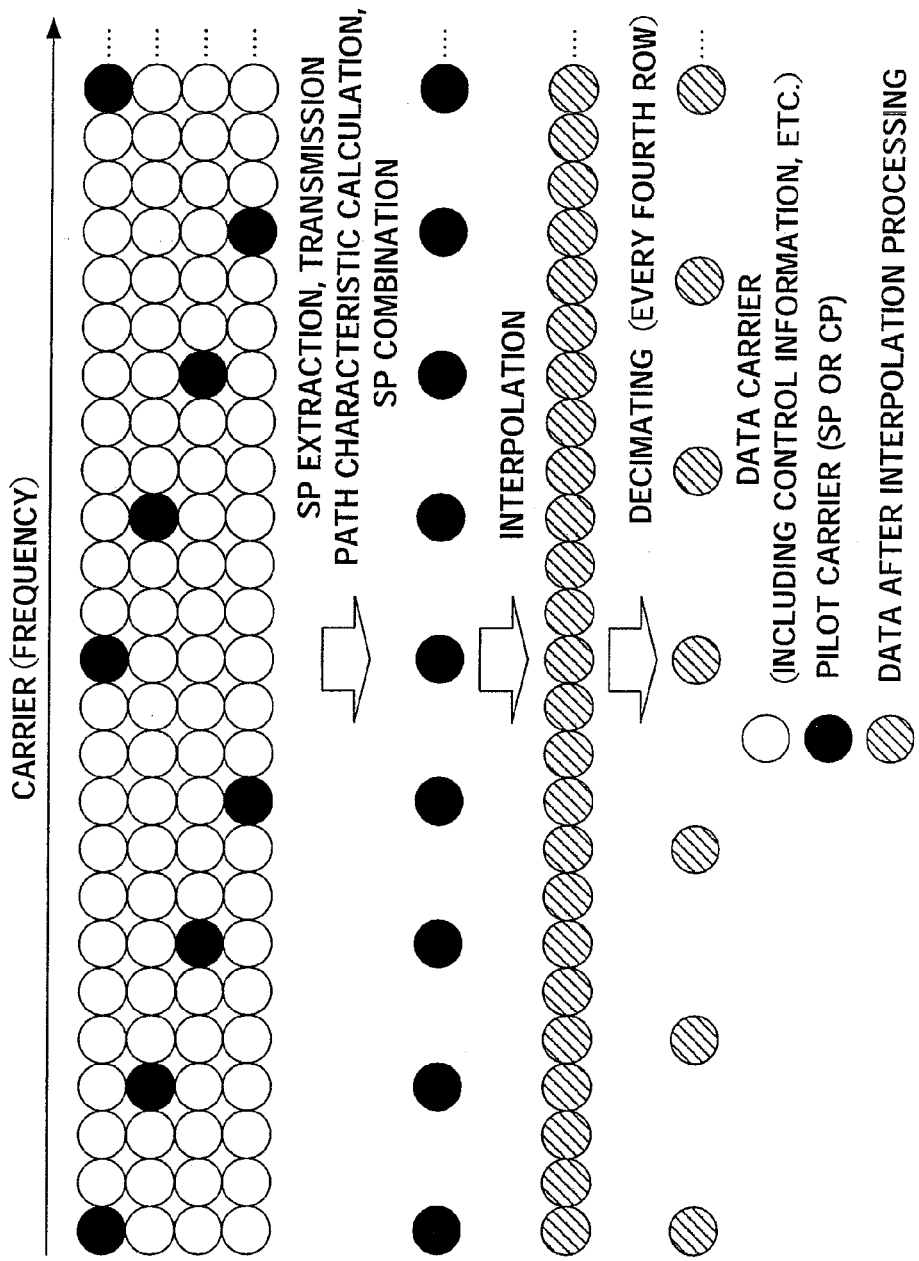
FIG. 3 is a schematic diagram illustrating an operation of a filter factor generation section of the loop interference canceller shown in FIG. 2.

When the four consecutive symbols are combined according to the rule R, the 0 insertion circuit 3312 inserts 0s at the positions of the data carriers deleted from among the combined SPs. That is, since the combined SPs are arranged every three carriers, two 0s are inserted at a time (see interpolation processing in FIG. 3).

Furthermore, the number of data pieces needs to be set to power of 2 so as to be handled by the IFFT circuit 3310 that follows and consecutive 0s are inserted to the right and left of the data outside the signal band. These insertions also depend on the rule R. In short, the data is expanded by inserting 0s so that the band has the same width as that of the signal band handled by the FFT circuit 3301.

The output of the 0 insertion circuit 3312 with these 0s inserted is supplied to the IFFT circuit 3310.

The IFFT circuit 3310 carries out an IFFT on the cancellation residual $E(\omega)$ with 0s inserted by the 0 insertion circuit 3312 and thereby transforms the residual $E(\omega)$ in the frequency domain into the residual $e(\omega)$ in the time domain, and therefore the output is supplied to the windowing circuit 3313.

The windowing circuit 3313 extracts a range to remove repetitive components of the transmission path characteristic from the time domain signal which is the output of the IFFT circuit 3310 according to the rule R or a range to limit the time domain signal to within the range of factors of the FIR filter 32, whichever is smaller. The rule R will be explained in more detail later.

The output of the windowing circuit 3313 is supplied to the first input of the phase rotation compensation circuit 3314.

The phase rotation compensation circuit 3314 compensates the phase rotation caused by a shift of the position of the carrier data which becomes the central frequency of the IFFT processing at the input to the IFFT circuit 3310 received by the time domain signal which is the first input according to the specification of the symbol number extraction circuit 3302 which is the second input. Since the input to the IFFT circuit 3310 depends on the rule R, phase compensation also depends on the rule R. In short, assuming that the shift of the central frequency is $\Delta\omega$, $\exp(-j\Delta\omega t)$ is multiplied for every time t of the time domain signal which is the first input, where j is an imaginary number unit. The rule R will be explained in more detail later.

When symbols including symbols with symbol number 0 are used according to the rule R, the position of the carrier data which becomes the central frequency of the IFFT processing in the input to the IFFT circuit 3310 is not shifted, and therefore phase compensation is not necessary and the phase rotation compensation circuit 3314 can be omitted.

The time domain signal which is the output of the phase rotation compensation circuit 3314 becomes the cancellation residual $e(t)$ and the output is supplied to the factor updating circuit 3311.

Then, the rule R and the processing of the SP combination circuit 33051, 0 insertion circuit 3312, windowing circuit 3313 and phase rotation compensation circuit 3314 dependent thereupon will be explained in more detail.

The rule R can be roughly divided into cases where one symbol is used, two symbols are used and four symbols are used.

Figure 7:
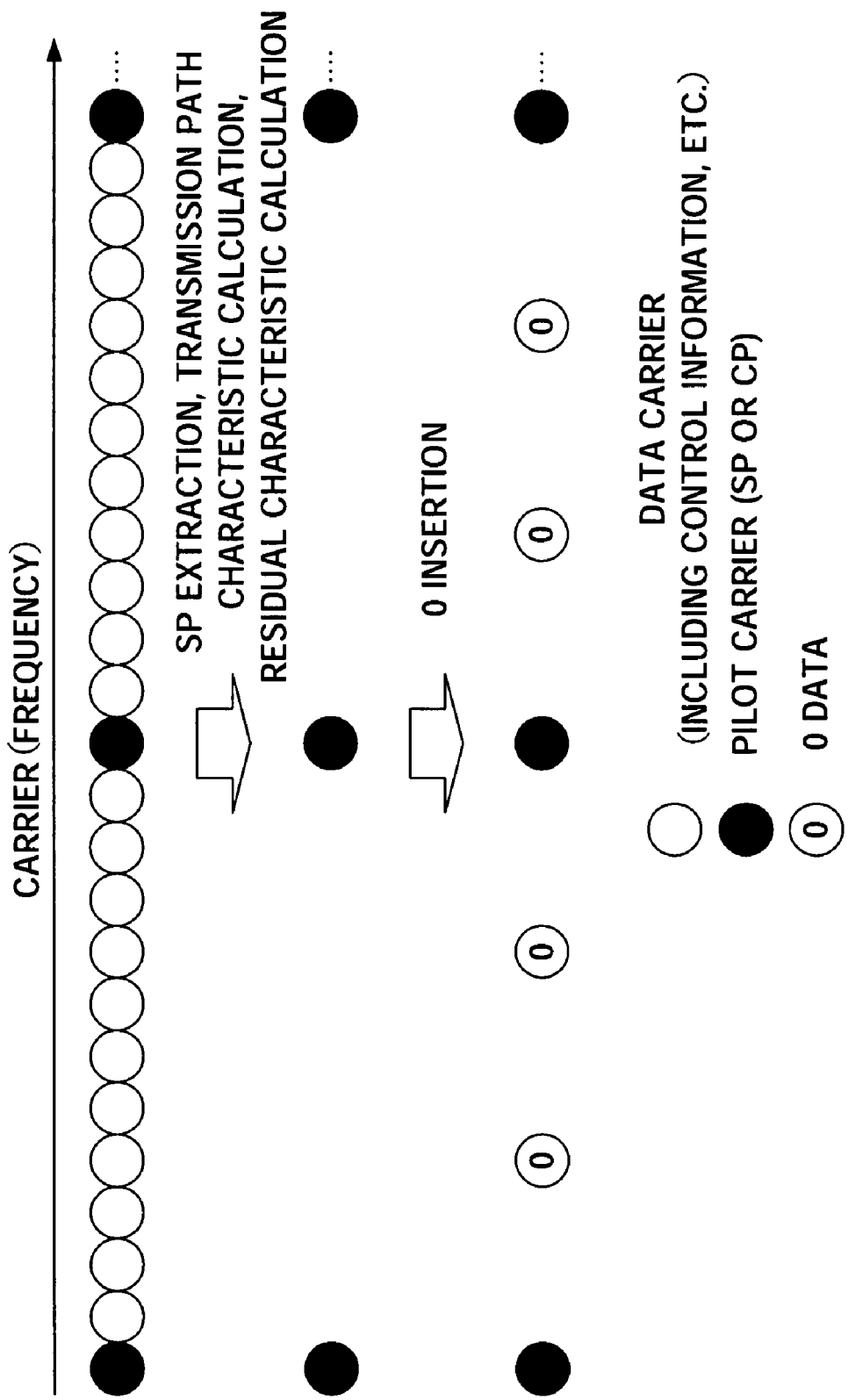
FIG. 7 is a schematic view illustrating an operation of a filter factor generation section when the number of symbols used for the loop interference canceller according to the embodiment of the present invention is assumed to be 1.

First, the processing of various sections in the case where the rule R uses one symbol will be explained. FIG. 7 schematically expresses the operation in the case where one symbol is used.

When only one symbol is used, the SP combination circuit 33051 is not necessary and the output of the transmission path characteristic estimation section 331a corresponds to the transmission path characteristic extracted every 12 carriers. The 0 insertion circuit 3312 extracts the transmission path characteristic every four carriers considering the greatest common divisor between 12 carriers and power of 2 in order to generate the transmission path characteristics extracted for every power of 2 before the processing at the IFFT circuit 3310 and inserts two 0s in 12 carriers. Furthermore, data is expanded through 0 insertion outside the data so that the same bandwidth of the signal handled by the FFT circuit 3301 is obtained. In that case, the bandwidth may not match the original bandwidth according to the SP arrangement rule depending on the symbol number.

More specifically, there is no bandshift with symbol number 0, a shift of (−3) carriers with symbol number 1, shift of (−6) carriers with symbol number 2 and shift of (−9) carriers with symbol number 3. The 0 insertion circuit 3312 supplies the output to the input of the IFFT circuit 3310 while keeping this shift. These signals have increased data by inserting 0s, but they are essentially signals for every 12 carriers, and therefore based on a well-known sampling theorem, the time domain is wrapped around every (1/12) symbol time at the output of the IFFT circuit 3310. For this reason, the windowing circuit 3313 to which the output of the IFFT circuit 3310 is supplied extracts only the signal of (1/12) symbol from time 0.

Figure 8:
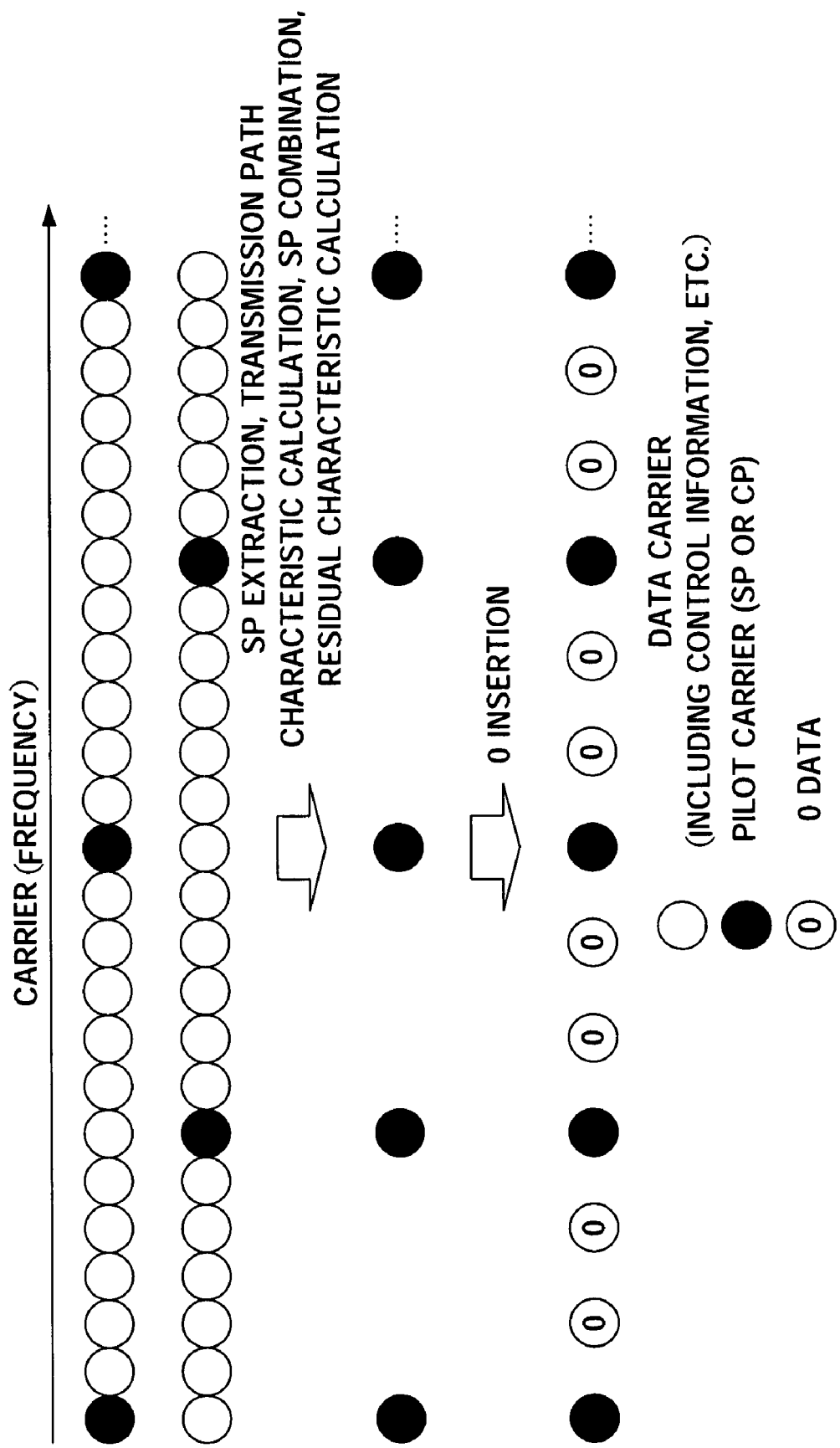
FIG. 8 is a schematic view illustrating the operation of the filter factor generation section when the number of symbols used of the loop interference canceller according to the embodiment of the present invention is assumed to be 2.

Then, the case where two symbols are used will be explained. FIG. 8 schematically expresses the operation when two symbols are used. Suppose that two symbols are not two continuous symbols but a set of two symbols with one intermediate symbol skipped. More specifically, a set of symbol numbers 0 and 2 or a set of symbol numbers 1 and 3. The SP combination circuit 33051 stores the transmission path characteristic $Fp(\omega)$ corresponding to SPs supplied to the first input as a set of two symbols and combines them so as to keep the order of original SPs. In the set of symbol numbers 0 and 2, symbols are rearranged in order of the left end of $Fp(\omega)$ of symbol number 0, left end of $Fp(\omega)$ of symbol number 2, second from the left end of $Fp(\omega)$ of symbol number 0, . . . . The same applies to the case of a set of symbol numbers 1 and 3. The output of the transmission path characteristic estimation section 331a becomes the transmission path characteristic extracted for every 6 carriers. In the case of a set of symbol numbers 1 and 3, the pilot signal at the right end does not follow the rule of extraction of every 6 carriers and therefore it is deleted.

In order to generate transmission path characteristics extracted for every (power of 2) prior to the processing at the IFFT circuit 3310, the 0 insertion circuit 3312 extracts transmission path characteristics every two carriers in consideration of the greatest common divisor of 6 carriers and (power of 2) and inserts two 0s in 6 carriers. Furthermore, outside the data, data is expanded by inserting 0s so that the same bandwidth of signals handled by the FFT circuit 3301 is obtained.

In that case, the original bandwidth may not be matched according to the SP arrangement rule depending on the symbol number. More specifically, there is no band shift in the set of symbol numbers 0 and 2 and a shift of (−3) carriers in the set of symbol numbers 1 and 3. The 0 insertion circuit 3312 supplies the output to the input of the IFFT circuit 3310 while keeping this shift. These signals have increased data through 0 insertion, but they are essentially signals for every 6 carriers, and therefore based on a well-known sampling theorem, the time domain is wrapped around every (1/6) symbol time at the output of the IFFT circuit 3310. For this reason, the windowing circuit 3313 to which the output of the IFFT circuit 3310 is supplied extracts only signals of (1/6) symbol from time 0. However, there is also a possibility that the (1/6) symbol time may exceed a guard time that guarantees the normal reception of symbols, and therefore it is not very practical and rather estimated to be limited within the range of the factor of the FIR filter section 32.

The phase rotation compensation circuit 3314 used in the cases where one symbol is used and two symbols are used compensates phase rotation caused by the above described carrier shift. As described above, the phase rotation that the signal in the time domain which is the first input of the phase rotation compensation circuit 3314 receives due to the above described carrier shift is proportional to a delay time from time 0 and the factor of proportionality is $(2\pi/8192)$ times the carrier shift in the case of mode 3 transmission according to the ISDB-T scheme. For example, in the case of a (−3) carrier shift, the factor of proportionality becomes $(-3)*(2\pi/8192)$ and if this factor of proportionality is assumed to be $\Delta\omega$, $\exp(-j*\Delta\omega*t)$ is multiplied as the phase compensation with a delay t from time 0.

Figure 9:
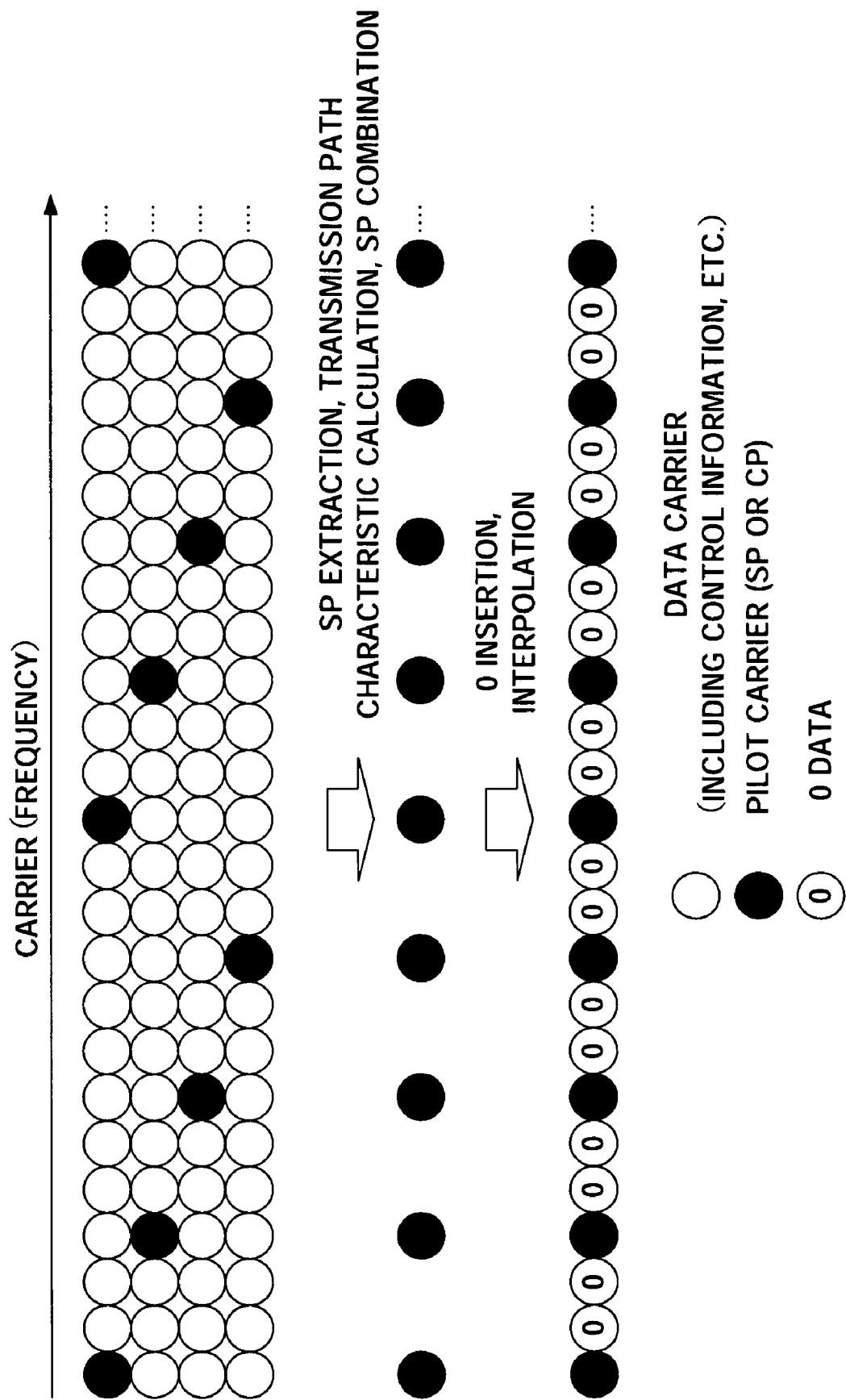
FIG. 9 is a schematic view illustrating the operation of the filter factor generation section when the number of symbols used of the loop interference canceller according to the embodiment of the present invention is assumed to be 4.

Then, a case where four symbols are used will be explained. FIG. 9 schematically expresses the operation when four symbols are used. When four continuous symbols are used, the operation of the SP combination circuit 33051 is the same processing as that of the SP combination circuit 3305 in FIG. 2 as described above. Unlike the case where one symbol is used or the case where two symbols are used, no carrier shift is produced. The 0 insertion circuit 3312 supplies the output to the input of the IFFT circuit 3310. These signals have increased data through 0 insertion, but these signals are essentially signals for every three carriers, and therefore based on a well-known sampling theorem, the time domain is wrapped around every (1/3) symbol time at the output of the IFFT circuit 3310. For this reason, the windowing circuit 3313 to which the output of the IFFT circuit 3310 is supplied extracts only signals of (1/3) symbol from time 0. However, there is a possibility that the (1/3) symbol time may exceed a guard time that guarantees the normal reception of symbols, and therefore it is not very practical and rather estimated to be limited within the range of the factor of the FIR filter section 32.

The rule R can be defined by various combinations and limits. For example, in the case of use of one symbol, only symbol number 0 is used so that the phase rotation compensation circuit 3314 is unnecessary. In the case of use of two symbols, only a set of symbol numbers 0 and 2 is used so that the phase rotation compensation circuit 3314 is unnecessary.

Furthermore, it is possible to improve the accuracy of calculations by increasing the number of symbols used at the time of starting or restarting the loop interference canceller and set fewer symbols where it is expected to reduce the number of data pieces processed and shorten the updating time every time the updating count at the factor updating circuit 3311 exceeds a specified count. During a normal operation when the number of symbols is increased and the variation of factors at the factor updating circuit 3311 becomes drastic, the number of data pieces processed is small and the updating time is expected to be shorter, and therefore it is also possible to decrease the number of symbols.

Figure 10:
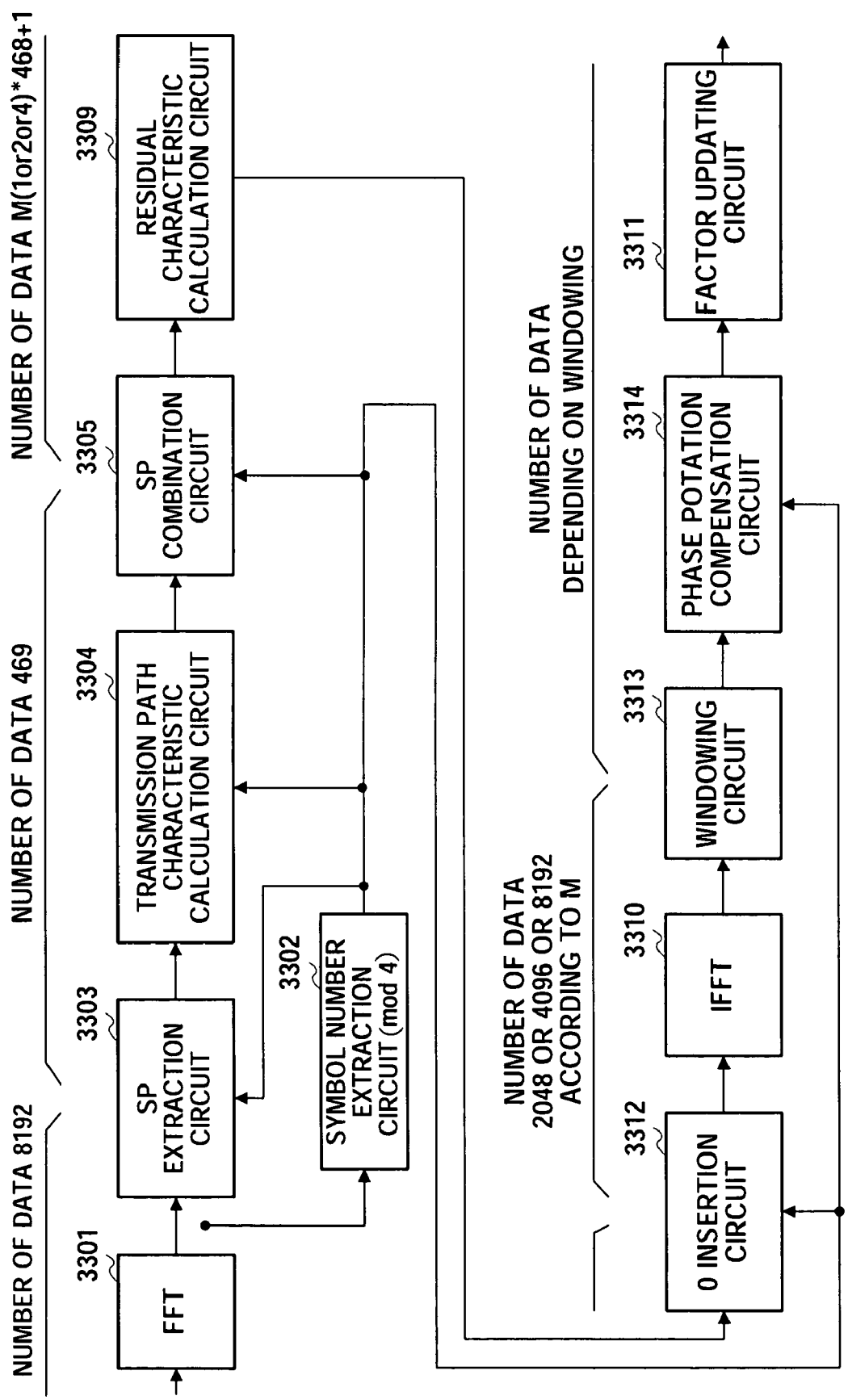
FIG. 10 is a block diagram showing a configuration of the filter factor generation section with the number of data pieces processed of various sections of the loop interference canceller according to the embodiment of the present invention annotated.

FIG. 10 is a block diagram with annotations made on the number of data pieces processed of various sections of the loop interference canceller 3a. Connections of various sections and their processing are completely the same as those in FIG. 6, and therefore explanations of the operation will be omitted. The number of data pieces corresponds to the case of mode 3 transmission according to the aforementioned ISDB-T scheme.

Figure 4:
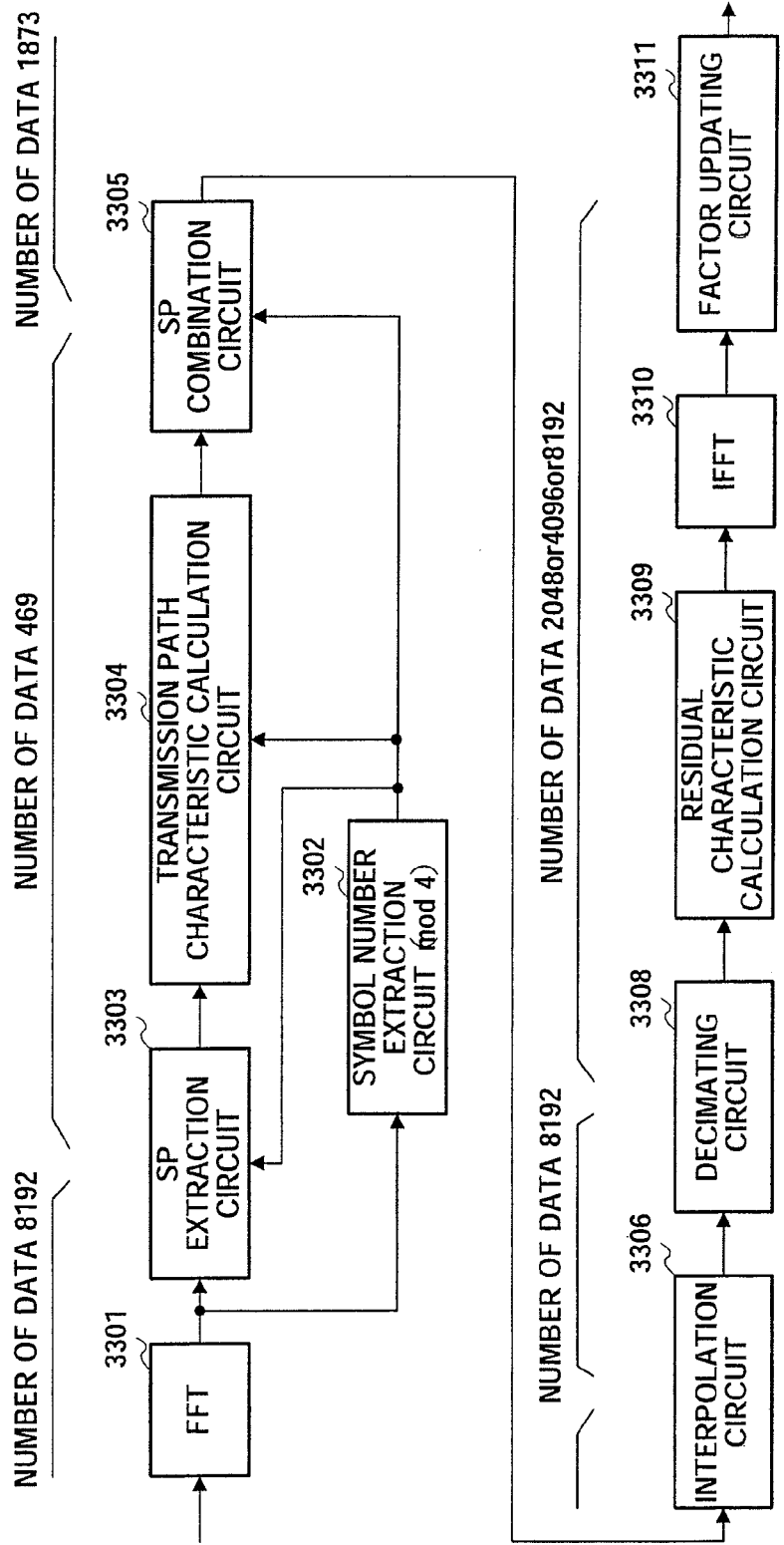
FIG. 4 is a block diagram showing a configuration of a filter factor generation section with the number of data pieces processed of various sections of the loop interference canceller shown FIG. 2 annotated.

At the input/output of the FFT circuit 3301, the input of the symbol number extraction circuit 3302 and the first input of the SP extraction circuit 3303, the number of data pieces is 8192. At the output of the SP extraction circuit 3303, the first input and output of the transmission path characteristic calculation circuit 3304 and the first input of the SP combination circuit 33051, the number of data pieces which is the number of SPs included in one symbol is 469. At the output of the SP combination circuit 33051, the input/output of the residual characteristic calculation circuit 3309 and the first input of the 0 insertion circuit 3312, the number of data pieces changes depending on the number of symbols M used for the rule R and it is (M*468+1) assuming that the pilot signal at the right end is included. At the output of the 0 insertion circuit 3312, the input/output of the IFFT circuit 3310 and the input of the windowing circuit 3313, the number of data pieces changes depending on the symbols used for the rule R, and it is 2048 with one symbol, 4096 with two symbols and 8192 with four symbols. At the sections that follow the windowing output, the number of data pieces depends on the windowing processing. In reality, it may be 682 close to (8192/12) when the number of symbols used for the rule R is one and 1024 which corresponds to a typical guard time (1/8) symbol time when the number of symbols is 2 or 4. Thus, the number of data pieces handled is decreased drastically compared to the conventional example shown in FIG. 4 and it can be expected to shorten the processing times of the respective sections and data input/output time among the respective sections.

Furthermore, as opposed to the loop interference canceller shown in FIG. 2 in which the transmission path characteristic of the entire band is obtained using interpolation at the output of the transmission path characteristic estimation section, this embodiment can use only SP parts as the output of the transmission path characteristic estimation section, obtain a residual characteristic, then insert 0s, apply IFFT and obtain a time domain signal corresponding to the residual characteristic of the entire band through windowing using a sampling theorem. Furthermore, unlike expansion to the incomplete entire band using a finite word length low pass filter of interpolation, expansion using the above described sampling theorem is expansion to the theoretically most accurate entire band. Furthermore, from the standpoint of a circuit scale with connections of the respective sections ignored, it is a configuration in which interpolation is replaced by 0 insertion and windowing, but since 0 insertion is processing of only insertion of 0 data and windowing is processing of simply extracting data, it is a circuit scale by far smaller than interpolation involving calculations.

Thus, according to the loop interference canceller 3a according to this embodiment, by limiting the number of data pieces of the transmission path characteristic estimation section 331a and carrying out expansion to the entire band through 0 insertion in the frequency domain and windowing after the time domain conversion and speeding up the adaptive operation of the loop interference canceller by reducing the number of data pieces processed, it is possible to achieve advantages effects of realizing high trackability to time variations of the phase and level of loop interference wave or key station wave, performing high processing inside more accurately, performing a high accuracy cancellation operation and realizing miniaturization of the apparatus with a reduced circuit scale.

As described above, the present invention speeds up the adaptive operation of the loop interference canceller with a reduced number of data pieces processed, realizes high trackability with respect to time variations of the phase and level of loop interference wave or key station wave, performs processing inside with higher accuracy, performs a high accuracy cancellation operation, reduces the circuit scale, and can thereby achieve the advantageous effect of realizing miniaturization of the apparatus.

This embodiment has described the loop interference canceller in an SFN relay system, but the present invention is also applicable to a repeater, etc., in a wireless LAN and mobile communication system if it is at least a system using an OFDM transmission scheme.

This application is based on the Japanese Patent Application No. 2002-299523 filed on Oct. 11, 2002 and the Japanese Patent Application No. 2003-343412 filed on Oct. 1, 2003, entire content of which is expressly incorporated by reference herein.

INDUSTRIAL APPLICABILITY

The present invention relates to a loop interference canceller which cancels loop interference using a transmission path characteristic estimated from an OFDM (Orthogonal Frequency Division Multiplexing) signal and is applicable to a loop interference canceller, relay system and loop interference canceling system used, for example, for a relay broadcasting station and a repeater in a radio communication realizing broadcast wave relay SFN in terrestrial digital broadcasting.

What is claimed is:

1. A loop interference canceller for canceling loop interference between transmission/reception antennas when multicarrier signals having reference carriers at regular intervals are relayed at the same frequency for transmission and reception, comprising:
   a cancellation section that cancels loop interference included in a received signal using a filter for which a factor is set;
   a transmission path characteristic estimation section that estimates the transmission path characteristic of a signal after said loop interference is canceled;
   a residual characteristic calculation section that calculates a cancellation residual based on the estimation result of said transmission path estimation section;
   a 0 insertion section that inserts 0 data for the output of said residual characteristic calculation section;
   an inverse fast Fourier transform section that transforms the output of said 0 insertion section into a time domain signal;
   a windowing section that, with respect to the output of said inverse fast Fourier transform section, extracts either a range without the repetitive component of the transmission path characteristic or a range specified by the factor of said filter, whichever is smaller; and
   an updating section that updates the factor of said filter based on the output of said windowing section.

2. The loop interference canceller according to claim 1, wherein said transmission path characteristic estimation section comprising:
   a fast Fourier transform section that transforms the output of said cancellation section which is a time domain signal to a frequency domain signal;
   a reference carrier information extraction section that extracts information indicating arrangement of reference carriers and signal components from the output of said fast Fourier transform section;
   a reference carrier extraction section that extracts only reference carriers from the output of said fast Fourier transform section according to the arrangement of the reference carriers obtained from the output of said reference carrier information extraction section; and
   a transmission path characteristic calculation section that calculates the transmission path characteristic of reference carriers by comparing the output of said fast Fourier transform section with the arrangement and signal component of the reference carriers obtained from the output of said reference carrier information extraction section.

3. The loop interference canceller according to claim 2, wherein said transmission path characteristic estimation section estimates the transmission path characteristic using only one set of outputs of said transmission path characteristic calculation section.

4. The loop interference canceller according to claim 2, wherein said transmission path characteristic estimation section further comprises a reference carrier combination section that stores a plurality of sets of outputs of said transmission path characteristic calculation section and combines the sets of stored outputs with different arrangements of reference carriers according to the arrangement of reference carriers obtained from the output of said reference carrier extraction section,
   said reference carrier combination section combines only two sets of outputs in which reference carriers are arranged at regular intervals, and
   the transmission path characteristic is estimated using the output of said reference carrier combination section.

5. The loop interference canceller according to claim 2, wherein said transmission path characteristic estimation section further comprises a reference carrier combination section that stores a plurality of sets of outputs of said transmission path characteristic calculation section and combines the sets of stored outputs with different arrangements of reference carriers according to the arrangement of reference carriers obtained from the output of said reference carrier extraction section,
   said reference carriers combination section combines only four sets of outputs in which reference carriers are arranged at regular intervals, and
   the transmission path characteristic is estimated using the output of said reference carrier combination section.

6. The loop interference canceller according to claim 1, wherein a specific set of reference carriers which do not require phase rotation compensation processing is used when the transmission path characteristic which is the output of said transmission path characteristic estimation section is estimated.

7. The loop interference canceller according to claim 1, further comprising a phase rotation compensation section that carries out phase rotation compensation according to the arrangement of carriers used to estimate said transmission path characteristic for the output of said windowing section, wherein said updating section generates a factor of said filter from the output of said phase rotation compensation section.

8. The loop interference canceller according to claim 4, wherein said reference carrier combination section changes the number of sets of outputs of said transmission path characteristic calculation section to combine at the time of starting or restarting or according to the state of the factor of said filter.

9. The loop interference canceller according to claim 5, wherein said reference carrier combination section changes the number of sets of outputs of said transmission path characteristic calculation section to combine at the time of starting or restarting or according to the state of the factor of said filter.

10. A relay system provided with the loop interference canceller according to claim 1.

11. A loop interference canceling method for canceling loop interference between transmission/reception antennas when multicarrier signals having reference carriers at regular intervals are relayed at the same frequency for transmission and reception, comprising:

a canceling step of canceling loop interference included in a received signal using a filter for which a factor is set;

a transmission path characteristic estimating step of estimating the transmission path characteristic of a signal after said loop interference is canceled;

a residual characteristic calculating step of calculating a cancellation residual based on the estimation result of said transmission path estimating step;

a 0 inserting step of inserting 0 data for the output result of said residual characteristic calculating step;

an inverse fast Fourier transforming step of transforming the output result of said 0 insertion step into a time domain signal;

a windowing step of, with respect to the output of said inverse fast Fourier transform step, extracting either a range without the repetitive component of the transmission path characteristic or a range specified by the factor of said filter, whichever is smaller; and an updating step of updating the factor of said filter based on the output result of said windowing step.

* * * * *